US006909217B2

(12) United States Patent
Angerpointner et al.

(10) Patent No.: US 6,909,217 B2
(45) Date of Patent: Jun. 21, 2005

(54) METHOD FOR PRODUCING SLIP RING BRUSHES AND SLIP RING BRUSHES MADE THEREBY

(75) Inventors: Ludwig Angerpointner, Munich (DE); Klaus Drost, Wolfratshausen (DE)

(73) Assignee: LTN Servotechnik GmbH, Otterfing (DE)

( * ) Notice: Subject to any disclaimer, the term of this patent is extended or adjusted under 35 U.S.C. 154(b) by 0 days.

(21) Appl. No.: 10/791,463

(22) Filed: Mar. 1, 2004

(65) Prior Publication Data

US 2005/0012426 A1 Jan. 20, 2005

(30) Foreign Application Priority Data

Feb. 28, 2003 (DE) ........................................ 103 09 213
May 30, 2003 (DE) ........................................ 103 24 699

(51) Int. Cl.[7] ................................................ H02K 39/08
(52) U.S. Cl. ........................................ 310/232; 310/71
(58) Field of Search ................................ 310/71, 67 R, 310/68 R, 232, 234; 439/11–26; 29/596–598

(56) References Cited

U.S. PATENT DOCUMENTS 4,583,797 A 4/1986 Engelmore et al.
4,850,880 A * 7/1989 Zayat et al. .................. 439/11
6,089,875 A * 7/2000 Iwata et al. .................... 439/26
6,356,002 B1 * 3/2002 Witherspoon et al. ...... 310/232
6,517,357 B1 * 2/2003 Athanasiou et al. ........... 439/26
2004/0169434 A1 * 9/2004 Washington, et al. ....... 310/232

FOREIGN PATENT DOCUMENTS

DE 1 275 672 8/1968

* cited by examiner

*Primary Examiner*—Thanh Lam
(74) *Attorney, Agent, or Firm*—Kenyon & Kenyon

(57) ABSTRACT

In a method for producing a slip ring brush, the slip ring brush including a brush element and a printed circuit board. The printed circuit board has a first surface and a second surface and has at least one printed circuit trace as well as at least one bore which penetrates the printed circuit board from the first surface to the second surface. An electrical contact between the brush element and the printed circuit trace is produced by soldering. The brush element is soldered such that solder penetrates from the second surface of the printed circuit board through the bore of the printed circuit board all the way to the brush element at the first surface.

16 Claims, 3 Drawing Sheets

Z - Z

METHOD FOR PRODUCING SLIP RING BRUSHES AND SLIP RING BRUSHES MADE THEREBY

CROSS-REFERENCE TO RELATED APPLICATIONS

The present application claims priority to Application No. 103 09 213.7, filed in the Federal Republic of Germany on Feb. 28, 2003, and to Application No. 103 24 699.1, filed in the Federal Republic of Germany on May 30, 2003, each of which is expressly incorporated herein in its entirety by reference thereto.

FIELD OF THE INVENTION

The present invention relates to slip ring brushes and a method for their manufacture.

BACKGROUND INFORMATION

Slip ring units are frequently made up of, among other things, a slip ring brush and slip rings. The slip ring brush, in operation, includes a sliding contact with rotating slip rings. Such slip ring units are used in many technical fields for transmitting electrical signals or electric power from a stationary unit to a rotating electric unit. In this context it is important that, on account of springy brush elements, there exist a good and lasting contact between the slip ring brush and the slip rings, even when, for example, the entire slip ring unit is exposed to vibrations.

In German Published Patent Application No. 1 275 672, a slip ring brush is shown, in which U-shaped brush wires are fastened to a brush block. During the course of mounting the slip ring brush, the brush wires are guided through the brush block and are clamped firmly to the brush block by a screw connection. This production method has the disadvantage, among other things, that it is comparatively costly and time-consuming.

In U.S. Pat. No. 4,583,797, a slip ring is described which also has essentially U-shaped brush wires. The U-shaped brush wires are also put through the brush block, which may be implemented as a printed circuit board having printed circuit traces. The brush wires are soldered to the printed circuit board in such a way that the soldering location is situated at the surface of the printed circuit board facing the rotor. This method of construction has the disadvantage that the mounting of the corresponding slip ring brush is expensive. In addition, slip ring brushes produced in this manner have a non-optimal quality with respect to their spring properties.

SUMMARY

It is an aspect of the present invention to provide a method for producing a slip ring brush which may involve minimum mounting effort and whereby qualitatively high-value slip ring brushes may be producible, using a small required space.

In addition, a slip ring brush may be provided by which the service life and the reliability of slip ring units may be significantly increased.

According to an example embodiment of the present invention, at least one brush element is soldered onto a first surface of a printed circuit board, the soldering procedure being undertaken in such a manner that solder, coming from the second surface of the printed circuit board, penetrates through bores in the printed circuit board all the way to the brush element. It is by this method that the printed circuit traces of the printed circuit board are electrically and mechanically connected to the brush element.

In the following, a “bore” should be understood to mean an opening or a hole which does not necessarily have to have a circular cross section, but may also have a multi-sided cross section or any other desired curvilinear geometries as the circumferential boundary.

In an example embodiment of the present invention, pads may be positioned at the second surface of the printed circuit board to which the ends of a cable, e.g., a flat ribbon cable, may be directly contacted.

In accordance with an example embodiment of the present invention, a method is for producing a slip ring brush, the slip ring brush including a printed circuit board having a first surface, a second surface opposite to the first surface, a printed circuit trace, and a bore penetrating the printed circuit board from the first surface to the second surface, and a brush element. The method includes producing an electrical contact between the brush element and the printed circuit trace by soldering such that solder coming from the second surface of the printed circuit board penetrates through the bore of the printed circuit board all the way to the brush element at the first surface.

The brush element may include an inner side and an outer side, and the method may include positioning the outer side of the brush element onto the first surface of the printed circuit board before the soldering.

The method may include aligning the brush element before the soldering such that the brush element is situated at an exit, from the first surface of the printed circuit board, of the bore.

The method may include metallizing the bore before the soldering.

The soldering may include at least one of a manual soldering process and a flow solder process.

The brush element may include a plurality of shanks.

The method may include contacting a pad on the second surface of the printed circuit board to the end of a cable, and the cable may include a flat band cable.

In accordance with an example embodiment of the present invention, a slip ring brush may include a printed circuit board including a first surface, a second surface opposite to the first surface, a printed circuit trace and a bore which penetrates the printed circuit board from the first surface to the second surface, and a brush element, the brush element and the printed circuit trace electrically coupled by a solder connection, solder of the soldered connection penetrating from the second surface of the printed circuit board through the bore to the brush element at the first surface.

The brush element may include an inner side and an outer side, and, at the soldered connection, the outer side of the brush element may point toward the first surface of the printed circuit board.

The brush element may be U-shaped and may include a plurality of shanks.

The brush element may include a noble metal alloy.

The bore may be metallized.

The slip ring brush may include a pad situated on the second surface of the printed circuit board configured to contact to an end of a cable, and the cable may include a flat band cable.

In accordance with an example embodiment of the present invention, slip ring brush may include a printed circuit board including a first surface, a second surface opposite to the first surface, a printed circuit trace and a bore which penetrates the printed circuit board from the first surface to the second surface, the printed circuit board including a pad on the second surface configured to contact an end of a cable, and a brush element including a noble metal alloy arranged in a U-shape and including a plurality of shanks. The brush element and the printed circuit trace may be electrically coupled by a solder connection, solder of the solder connection penetrating from the second surface of the printed circuit board through the bore of the printed circuit board to the brush element at the first surface.

BRIEF DESCRIPTION OF THE DRAWINGS

FIGS. 3*a* to 3*d* shows a schematic representation of an example embodiment of a method for producing a slip ring brush according to the present invention.

DETAILED DESCRIPTION

Figure 1:
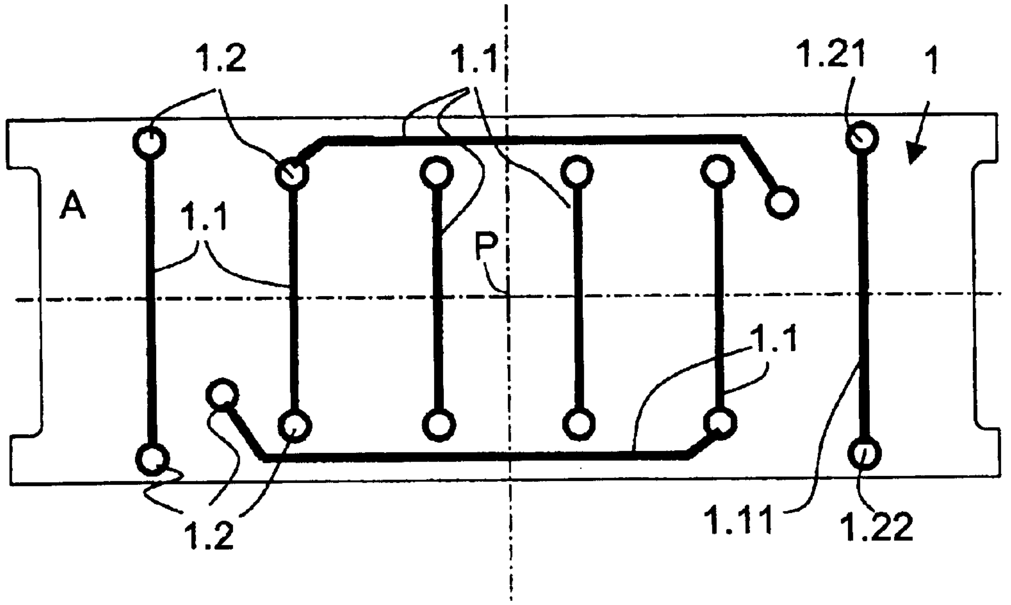
FIG. 1 shows a top view of a first surface of a printed circuit board used as a brush block.

FIG. 1 shows a top view of a first surface A of a printed circuit board 1. On this surface A, there are printed circuit traces 1.1, 1.11, made of copper in the example shown, which end at bores 1.2, 1.21, 1.22. These bores 1.2, 1.21, 1.22, which penetrate printed circuit board 1 all the way through, are metallized, so that they are metallically coated on their inner walls, as well as ring-shaped at their inner wall edges, using tin in the example shown. Printed circuit board 1 is made of epoxy resin filled with glass fibers, and it has a comparatively low heat conductivity. Alternatively, other materials may also be used for printed circuit board 1, such as materials based on polyamide components, ceramic components, etc.

Figure 2:
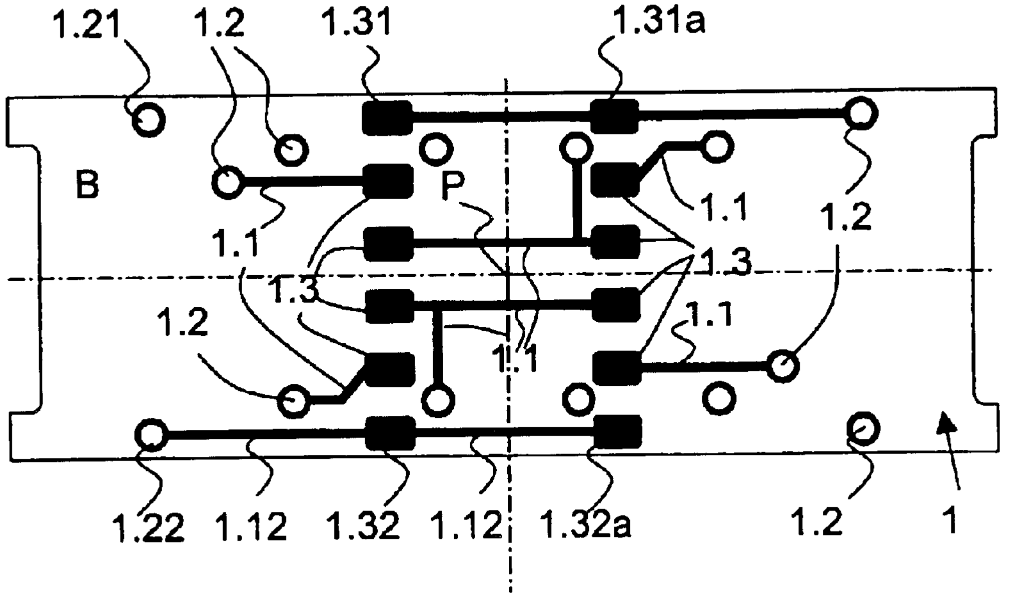
FIG. 2 shows a top view of a second surface of the printed circuit board, opposite to the first surface.
Figure 3A:
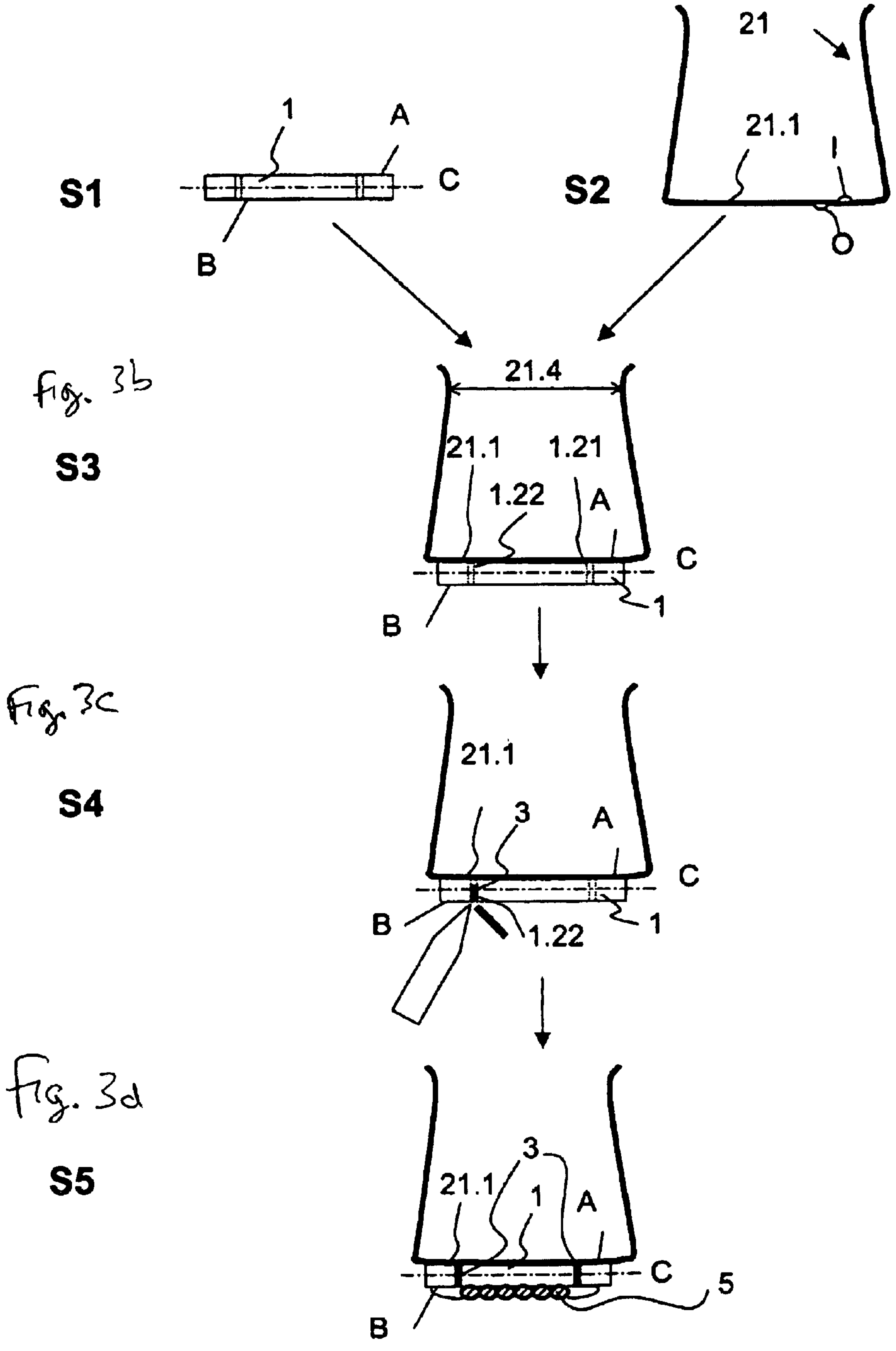

FIG. 2 shows a top view onto a second surface B of printed circuit board 1. In this view, besides bores 1.2, 1.21, 1.22 and additional circuit traces 1.1, 1.12, pads 1.3, 1.31, 1.31*a*, 1.32, 1.32*a* are shown. Parallel to the plane of the drawing of FIGS. 1 and 2 there is a virtual geometric plane, namely center longitudinal section C, which is shown in FIGS. 3*a* to 3*d* and 5 in side views of printed circuit board 1. As shown, center longitudinal section C is located centrically between the two surfaces A and B.

As shown in FIGS. 1 and 2, both on surface A and on surface B, printed circuit traces 1.1, 1.11, 1.12 and pads 1.3, 1.31, 1.31*a*, 1.32, 1.32*a* are positioned centrosymmetrically with respect to surface center P. In addition, this symmetrical viewing with respect to surface center P holds also for bores 1.2, 1.21, 1.22 and the outer contour of printed circuit board 1.

As shown in FIGS. 3*a* to 3*d*, 4 and 5, the slip ring brush also includes brush elements which are laid out in the example shown as wire brackets 2, 21. Wire brackets 2, 21, which are all configured identically, have three shanks 2.1 and 21.1, 2.2, and 21.2, 2.3 and 21.3, respectively, and are substantially U-shaped or Ω-shaped, so that the wire brackets 2, 21 each have an opening 21.4. Wire brackets 2, 21 or rather their shanks 2.1, 21.1, 2.2, 21.2, 2.3, 21.3 have an inner side I and an outer side O. The inner side I is that geometric region of shanks 2.1, 21.1, 2.2, 21.2, 2.3, 21.3 which points to the center or rather to the center of mass of wire bracket 2, 21. By contrast, outer side O points from the center of U-shaped or Ω-shaped wire bracket 2, 21 towards the exterior. Outer side O is also at the outer circumference of wire bracket 2, 21.

In the exemplary embodiment illustrated, wire brackets 2, 21 may be produced by a bending method from a wire 20 mm in length, having a diameter of 0.2 mm. Conditional upon the requirements with respect to a method of construction of the slip ring units that is as miniaturized as possible, wire brackets 2, 21 may have a correspondingly small diameter. Wire brackets 2, 21 that are so thin, have an extremely large surface with respect to volume (approximately 20 $mm^2/mm^3$), and they take on the surrounding temperature over their entire volume and within a short time. In the example shown, wire brackets 2, 21 are made of a noble metal alloy. According to an example embodiment, as the main component, this noble metal alloy includes palladium, along with some proportions of copper and silver. As an alternative, one may also use a mixture of gold, copper and silver as the noble metal alloy, gold being able to be used as the main component. The components of the alloy may have a positive electrochemical potential with reference to hydrogen having a zero potential.

The method for producing the slip ring brush according to an example embodiment of the present invention, shall be explained in the light of the connection and contacting of wire bracket 21 to printed circuit board 1.

Firstly, in the method according to FIGS. 3*a* to 3*d*, in steps S1 and S2, printed circuit board 1 and a wire bracket 21 are made available. Then, in step S3, outer side O of shank 21.1 of wire bracket 21 is placed on surface A of printed circuit board 1 in such a way that outer side O of shank 21.1 is positioned to lie at the exit of bores 1.21, 1.22. Wire bracket 21 is aligned in such a manner that, with respect to center cross-section C of printed circuit 1, opening 21.4 is on the same side as surface A, on which shank 21.1 is set. In other words, starting from center cross-section C, the respective elements are arranged in the following order: surface A, shank 21.1, opening 21.4, so that shank 21.1 lies between printed circuit board 1 and opening 21.4. In one case, shank 21.1 is set upon surface A of printed circuit board in such a manner that it gets to lie centrically over the respective exit of bores 1.21, 1.22. However, in practice it is seen that here deviations of ±0.4 mm from the center of bores 1.21, 1.22 may be tolerated, without significant quality losses in the soldering connection being observed. Shanks 21.1 are mounted at the exit of bores 1.21, 1.22 on printed circuit board 1. At the exit of bores 1.21, 1.22 there is a surface area within which a mounted shank 21.1 may still be soldered to function with the aid of solder 3, which penetrates all the way through bores 1.21, 1.22.

After wire bracket 21, or rather its shank 21.1, has now been mounted in such a manner at the exit of bores 1.21, 1.22 on printed circuit board 1, it is durably fastened to printed circuit board 1, in the example shown, by a manual soldering method. In this context, the hot solder or the hot tin solder is introduced from surface B of printed circuit board 1 into bores 1.21, 1.22, so that it rises as a result of the capillary action through bores 1.21, 1.22 and through the gap between bores 1.21, 1.22 and wire bracket 21. The heat source for the soldering process is thus on the side of printed circuit board 1 opposite wire bracket 21, so that printed circuit board 1 exerts an effect on wire bracket 21 that shields it from heat input.

As was already described, such filigree brackets 2, 21 may very rapidly take on the surrounding temperature. If a wire bracket 2, 21 were directly exposed to a temperature such as appears in a usual soldering process, it may be completely heated through without a significant time delay. However, warming it through at this temperature level, in the case of materials that are commonly used for wire brackets 2, 21, may lead to a change in the material structure, which, in the final analysis, may have a deteriorating effect on the elastic deformability of wire brackets 2, 21 and on their spring constants. Thus, among other things, because of the method according to an example embodiment of the present invention, a temperature-protecting treatment of wire brackets 2, 21 may be achieved if the latter are soldered to printed circuit board 1.

According to the foregoing method, one may avoid exposure of wire brackets 2, 21 to high temperatures, so that, because of the soldering, no impairment of their spring properties or their elasticity may be determined, in particular in regions which, during operation, have to have a high elasticity, such as shanks 2.2, 21.2 and 2.3, 21.3, as well as the transition regions from these shanks 2.2, 21.2, 2.3, 21.3 to shanks 2.1, 21.1. Thereafter, using the same method, all the remaining wire brackets 2 are fastened to printed circuit board 1. In this manner, by one work procedure, namely the soldering process, both electrical contacting between wire brackets 2, 21 and printed circuit traces 1.1, 1.11, 1.12 and a firm mechanical connection between wire brackets 2, 21 and printed circuit board 1 are produced. Additional work procedures for fastening wire brackets 2, 21 onto printed circuit board 1 may not be absolutely necessary, so that, using the method, an exceedingly economical production of slip ring brushes may be possible. Printed circuit board 1 may also function as a brush block of a slip ring brush.

Alternatively to the manual soldering method, a flow solder method may also be used, in which, before the actual soldering, shanks 2.1, 21.1 of wire brackets 2, 21 are made to adhere to surface A of printed circuit board 1, the wire brackets being in turn aligned in such a manner that opening 21.4, with respect to center longitudinal section C of printed circuit board 1 is on the same side as surface A, and the relevant bores for the contacting, 1.2, 1.21, 1.22 are covered by shanks 2.1, 21.1 of wire brackets 2, 21, or shanks 2.1, 21.1 lie at the exit of bores 1.2, 1.21, 1.22. Thereafter, printed circuit board 1 is moved via a transportation system at uniform speed through a soldering machine and exposed to a flow solder method. In order to avoid pads **1.3, 1.31, 1.31*a*, 1.32, 1,32*a* taking on solder, or, if certain bores 1.2, 1.21, 1.22 are not to be filled with solder on printed circuit board 1, heat-resistant adhesive strips may be used to close off these pads 1.3, 1.31, 1.31*a*. 1.32, 1.32*a* or the appropriate bores 1.2, 1.21, 1.22** before the flow soldering.

All the shanks 2.1, 21.1, 2.2, 21.2, 2.3, 21.3 of wire brackets 2, 21, after step S4 are on one side of printed circuit board 2, 21, e.g., on the side of surface A. This arrangement may provide, as a consequence, on surface B of printed circuit board 1, that for soldering on a cable, in the example shown a flat band cable 5, there are no shanks 2.1, 21.1, 2.2, 21.2, 2.3, 21.3 of wire brackets 2, 21, which may act as geometric obstacles or interference contours for the soldering-on process. Flat band cable 5, according to FIG. 5, has six single wires 5.1 to 5.6 having appropriate insulation, each individual wire 5.1 to 5.6 is surrounded in each case by a plastic insulation of a different color, for the purpose of their identification. The use of a flat band cable 5, among other things, may provide that the sequence of the individual wires 5.1 to 5.6 is predefined by the lateral connection of the plastic insulation, so that a mixup of individual wires 5.1 to 5.6 during soldering to respective pads **1.3, 1.31, 1.31*a*, 1.32, 1.32*a* may be largely avoided. Thus, the insulated ends of individual wires 5.1 to 5.6 of flat band cable 5 are soldered in step S5 to pads 1.3, 1.31, 1.32 using a manual soldering method. Since surface B of printed circuit board 1 has no geometrical obstacles for soldering, the soldering may be done very quickly, and a continuously high quality of the soldering at locations between the ends of flat band cable 5 and pads 1.3, 1.31, 1.32** may be achieved.

Figure 4:
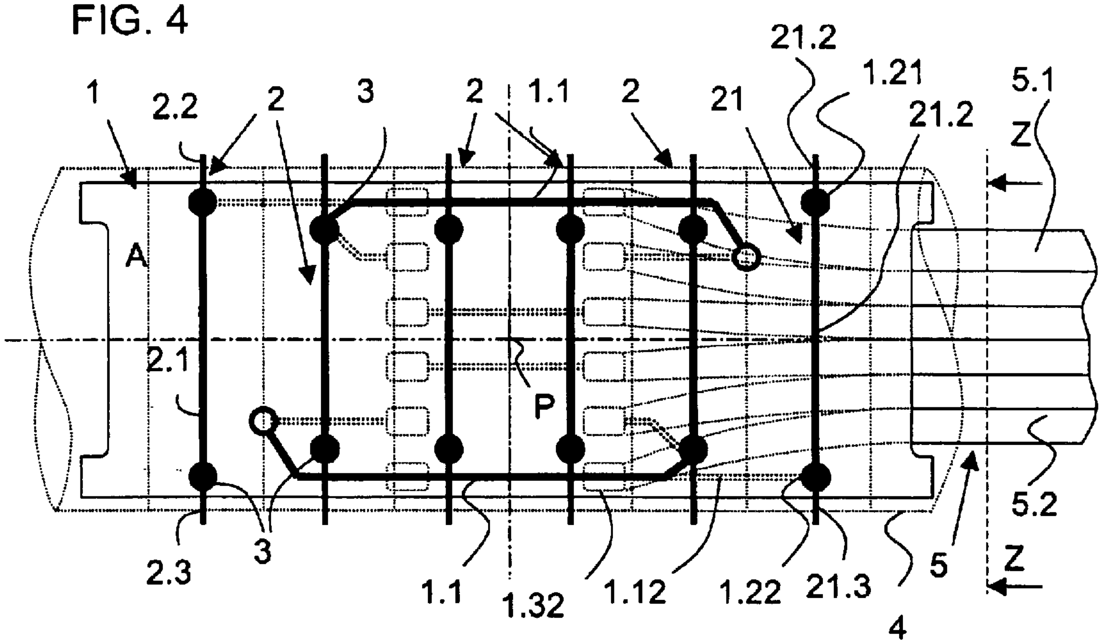
FIG. 4 shows a top view of the slip ring brush having a flat band cable.

FIG. 4 shows a top view of a slip ring brush according to an example embodiment of the present invention. In FIG. 4, wire brackets 2, 21, that are soldered onto printed circuit board 1 project outwards from the plane of the drawing. In FIG. 4, rotor 4 is made up of six individual slip rings that are axially consecutive and electrically insulated from one another, as it is provided in the ready-mounted slip ring unit, indicated by dotted lines. In addition, FIG. 4 also shows flat band cable 5, which is fastened to surface B of printed circuit board 1, the contours of flat band cable 5, covered by printed circuit board 1, also being shown by dotted lines.

Figure 5:
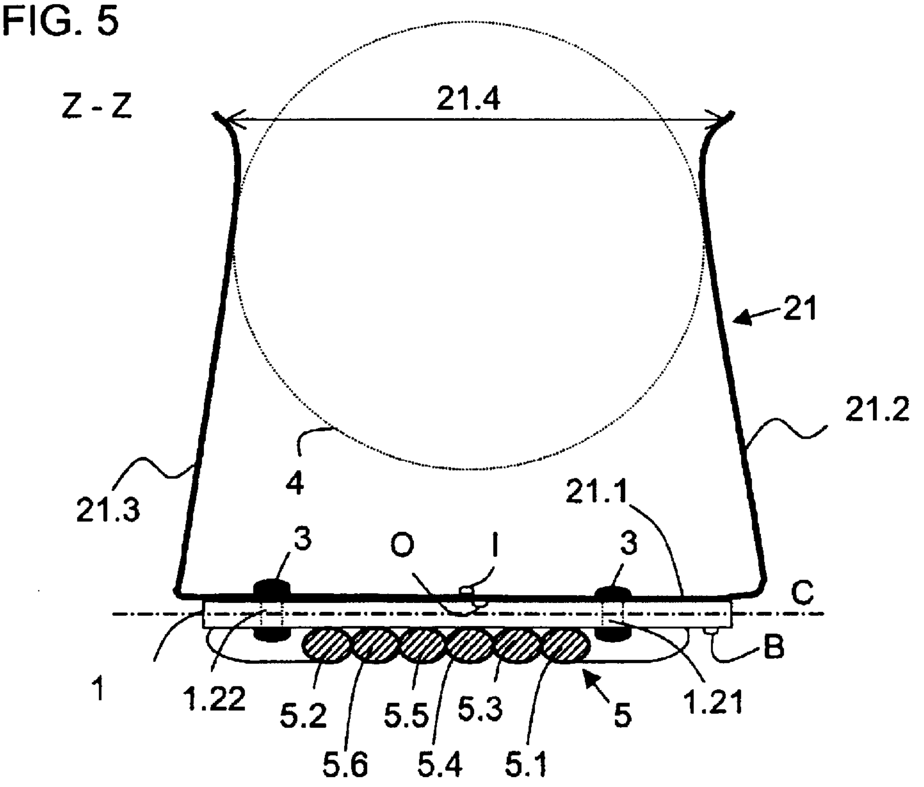
FIG. 5 shows a side view of the slip ring brush having brush elements fastened to the printed circuit board and a flat band cable.

FIG. 5 shows a side view of the slip ring brush according to an example embodiment of the present invention, made up of printed circuit board 1, which is used as a brush block, and wire bracket 21, which represents a brush element. At the slip ring brush, or rather at printed circuit board 1, a flat band cable 5 is contacted, according to section Z—Z (FIG. 4). Outer individual wires 5.1, 5.2 are bent divergently in the region of the connection of flat band cable 5, corresponding to the pattern of pads 1.3, 1.31, 1.32 (FIG. 2). According to FIG. 4, shanks 21.2, 21.3 of wire bracket 21 contact a slip ring of rotor 4. For a trouble-free functioning of the slip ring unit, it may be necessary that at all times at least one of shanks 21.2, 21.3 contacts a slip ring. A decisive variable for this behavior is the spring constant of wire bracket 21. This spring constant may not be influenced by the thermally gentle production method of the slip ring brush. Thus, because of the slipping contact, currents are transmitted by the rotor to wire bracket 21, for example. The current is conducted to printed circuit trace 1.11, which is located on surface A of the printed circuit board, via bores 1.21, 1.22 that are filled up with solder 3. By contacting to two bores 1.21, 1.22, it may be ensured, on the one hand, that a sufficiently firm mechanical connection exists, and, on the other hand, a redundant electrical connection may also be achieved because bores 1.21, 1.22 are connected to each other by printed circuit trace 1.11. The current to be transmitted then reaches pad 1.32, via printed circuit trace 1.12 on surface B of printed circuit 1. At this pad 1.32, a single wire 5.2 of flat band cable 5 is soldered on, so that the current to be transmitted is able to flow into flat band cable 5.

Because of the symmetrical positioning of bores 1.2, 1.21, 1.22, printed circuit traces 1.1, 1.11, 1.12 and pads **1.3, 1.31, 1.31*a*, 1.32, 1.32*a* with respect to point P, the rejection rate during production of the slip ring brush and the processing time during that production may be considerably reduced. For this reason, when mounting a wire bracket 2, 21, one may only have to make sure that the correct side, for example, surface A of printed circuit board 1 is selected for the mounting. By contrast, a position of printed circuit board 1** rotated about point P through 180° makes no difference to the later functionability of the slip ring brush.

What is claimed is:

1. A method for producing a slip ring brush, the slip ring brush including a printed circuit board having a first surface, a second surface opposite to the first surface, a printed circuit trace, and a bore penetrating the printed circuit board from the first surface to the second surface, and a brush element, comprising:

producing an electrical contact between the brush element and the printed circuit trace by soldering such that solder coming from the second surface of the printed circuit board penetrates through the bore of the printed circuit board all the way to the brush element at the first surface.

2. The method as recited in claim 1, wherein the brush element includes an inner side and an outer side, the method further comprising positioning the outer side of the brush element onto the first surface of the printed circuit board before the soldering.

3. The method as recited in claim 1, further comprising aligning the brush element before the soldering such that the brush element is situated at an exit, from the first surface of the printed circuit board, of the bore.

4. The method as recited in claim 1, further comprising metallizing the bore before the soldering.

5. The method as recited in claim 1, wherein the soldering includes at least one of a manual soldering process and a flow solder process.

6. The method as recited in claim 1, wherein the brush element includes a plurality of shanks.

7. The method as recited in claim 1, further comprising contacting a pad on the second surface of the printed circuit board to the end of a cable.

8. The method as recited in claim 7, wherein the cable includes a flat band cable.

9. A slip ring brush, comprising:

a printed circuit board including a first surface, a second surface opposite to the first surface, a printed circuit trace and a bore which penetrates the printed circuit board from the first surface to the second surface; and a brush element, the brush element and the printed circuit trace electrically coupled by a solder connection, solder of the soldered connection penetrating from the second surface of the printed circuit board through the bore to the brush element at the first surface.

10. The slip ring brush as recited in claim 9, wherein the brush element includes an inner side and an outer side, and, at the soldered connection, the outer side of the brush element points toward the first surface of the printed circuit board.

11. The slip ring brush as recited in claim 9, wherein the brush element is U-shaped and includes a plurality of shanks.

12. The slip ring brush as recited in claim 9, wherein the brush element includes a noble metal alloy.

13. The slip ring brush as recited in claim 9, wherein the bore is metallized.

14. The slip ring brush as recited in claim 9, further comprising a pad situated on the second surface of the printed circuit board configured to contact to an end of a cable.

15. The slip ring brush as recited in claim 14, wherein the cable includes a flat band cable.

16. A slip ring brush, comprising:

a printed circuit board including a first surface, a second surface opposite to the first surface, a printed circuit trace and a bore which penetrates the printed circuit board from the first surface to the second surface, the printed circuit board including a pad on the second surface configured to contact an end of a cable; and a brush element including a noble metal alloy arranged in a U-shape and including a plurality of shanks;

wherein the brush element and the printed circuit trace are electrically coupled by a solder connection, solder of the solder connection penetrating from the second surface of the printed circuit board through the bore of the printed circuit board to the brush element at the first surface.

* * * * *